Patented Oct. 17, 1950

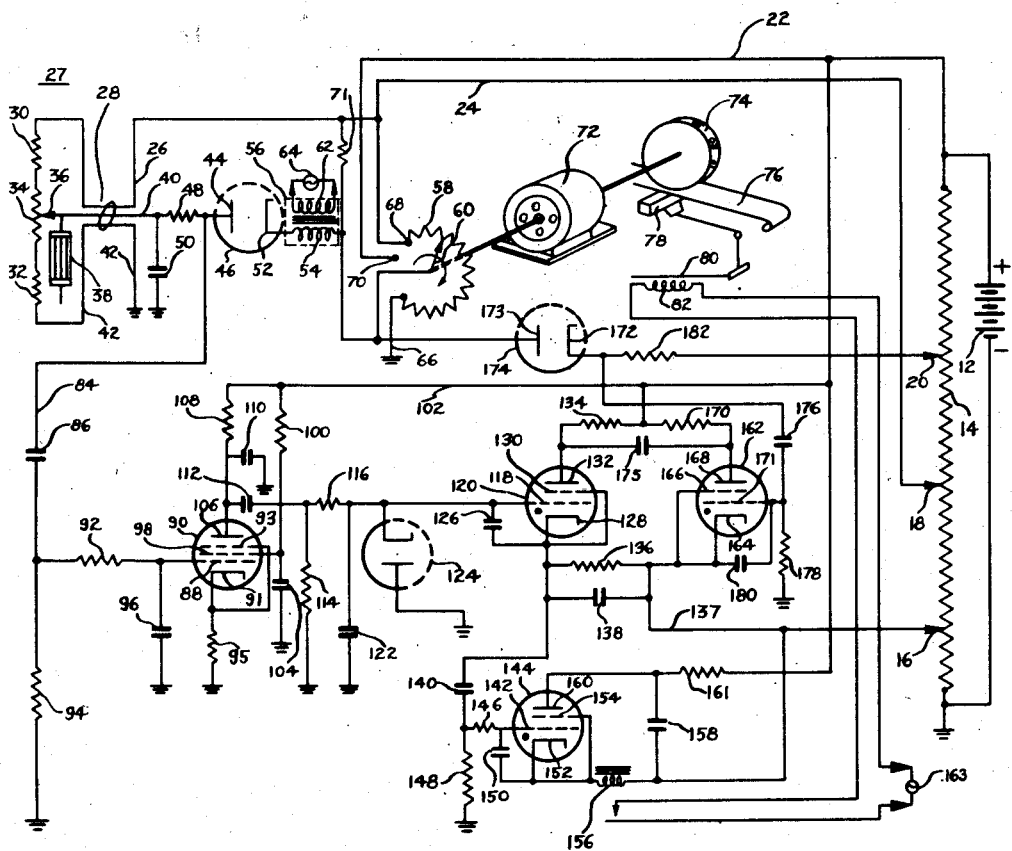

2,525,841

UNITED STATES PATENT OFFICE 2,525,841

ELECTRIC MEASURING CIRCUIT WITH TRANSIENT BALANCE CONTROL

Ralph E. Sturm and James R. Cosby, Towson, Md., assignors to Bendix Aviation Corporation, Baltimore, Md., a corporation of Delaware Application August 24, 1946, Serial No. 692,892

13 Claims. (Cl. 171—95)

This invention relates to devices for measuring variable magnitudes and, more particularly, to a class of such devices in which a search variable is swept through a range of values including that of the stimulus under measurement, and an indicating operation is initiated when the search value and the measured value bear a predetermined relation to one another.

The apparatus of this type known to the prior art has suffered from several deficiencies seriously limiting its utility in the hands of unskilled operators, especially when a large range of measured magnitudes is to be accommodated. The presence of some form of balance sensing apparatus may be regarded as basic to this mode of operation and it is customary to effect an indicating operation of some sort when the input to the balance indicating device traverses the region of zero stimulus. The use of mechanical balance indicators is attended by contact bounce often producing erroneous indications. When the balance indicator is of a nature affording high sensitivity in the zero stimulus region, it will not, normally, long endure the stresses produced in the presence of large off-balance stimuli.

When A. C. amplifiers are used for enhancing the sensitivity of apparatus employing direct or steady measuring and search potentials, the existence of the predetermined relationship between the measured and search voltage is usually characterized by the appearance of a pulse in the amplifier output. From the standpoint of reliability, the appearance of a steady signal at this time is much to be preferred and, hence, A. C. bridges have, to some extent, been used for this purpose. In A. C. bridges a voltage exists on either side of the balance point, merely passing through zero and reversing in phase as balance is passed. Hence, while a signal which may be used for control purposes exists after the balance point has been passed, such a signal is also present before the balance point has been reached, differing only in phase. Further, when an A. C. bridge is used, the measuring circuit calibration is easily upset by the existence of stray capacitance in the leads. All these deficiencies of existing apparatus have been found minimized to the point where they may be neglected in a circuit where direct current is used in the bridge or voltage comparing circuit, but an alternating current is used for the generation of a signal at and after the moment when balance or equality of two voltages is reached.

Accordingly it is an object of the invention to provide a new and novel balance sensing combination of a non-mechanical nature.

It is a further object of the invention to provide a new and novel balance indicator substantially non-responsive to excessive stimuli far removed from zero stimulus region.

Yet another object of the invention is to provide a new and novel balance indicator delivering an impulse upon passage through the zero stimulus region but incapable of repeating that impulse prior to appropriate resetting.

Still another object of the invention is to provide new and novel circuit means for comparing direct current voltages and generating an alternating current signal when the voltages compared bear a predetermined relation to one another.

Other objects and advantages of the invention will in part be described and in part be obvious when the following specification is read in conjunction with the drawing in which the single figure illustrates schematically the electrical circuits of a device embodying the principles of the invention.

A plurality of thermionic valves is illustrated, each provided with an electron emissive cathode brought to operating temperature by an associated heater. Neither the heaters nor the circuits for energizing same have been illustrated in the interest of preserving simplicity of presentation, since any of the many conventional heater configurations may be successfully employed.

In the circuit illustrated, operating potentials are derived from the battery 12 having its negative terminal connected to ground and its positive terminal connected to one end of a voltage divider 14, the other end of which is also grounded. The voltage divider 14 is tapped at several intermediate points to provide a number of operating voltages whose purpose will be evident from their names and from the following descriptive material. The lower tap 16 serves to provide operating bias for three discharge valves and may hence be termed the bias tap 16. Next in the order of increasing positive potential there is the measuring circuit tap 18 supplying energy to the measuring bridge. In practice the voltage of measuring tap 18 with respect to ground has been set at approximately 50 volts.

The next higher voltage tap is the reset blocking tap 20 which may have a potential of approximately 100 v. with respect to ground. This voltage prevents operation of the reset circuit during the measuring cycle. Line 22 is at the battery terminal potential, which may be 150 volts.

Voltage from the measuring circuit tap 18 passes through lead 24 and lead 26 in the measuring station cable 28 to a measuring station 27 which may contain fixed resistors 30 and 32 in series with a potentiometer 34 having a movable tap 36 adapted for actuation by hair element 38. As the hair element changes in length, tap 36 moves to and fro over potentiometer 34 varying the potential applied to lead 40 running through and from the measuring station cable 28. The ground circuit return for the measuring station is provided by lead 42 running through cable 28 to the chassis of the voltage comparing portion of the apparatus.

It will be apparent that the element so far described is one for translating changes in humidity into changes in electric voltage. Variables other than humidity may be similarly measured by use of appropriate condition responsive elements driving variable resistors or by the use of resistors or other circuit elements themselves directly responsive to the condition being monitored.

The lead 40 from the measuring station is connected with the anode 44 of the diode 46 through a bridge signal resistor 48, shunted at its cable end by a capacitor 50 to minimize the response of the apparatus to stray electric transients appearing in the cable 28. There is associated with anode 44 a thermionic cathode 52 connected through secondary 54 of transformer 56 to the movable arm 60 of a search voltage potentiometer 58. The primary 62 of transformer 56 may be energized from any suitable alternating current source 64 to impress on cathode 52 a corresponding alternating voltage.

One terminal of the winding of search voltage potentiometer 58 is grounded at 66 while the other terminal 68 is connected to the measuring voltage line 24. The resistive element of potentiometer 58 occupies less than the entire 360° arc and an auxiliary contact 70 connected with the battery line 22 is situated within the unused portion of the arc. A motor 72 drives the potentiometer arm 60 continuously in a clockwise direction, as indicated, whereby the arm 60 successively engages the entire length of the winding of potentiometer 58 and momentarily engages the auxiliary contact 70 during its passage thereby. A character bearing disk 74 is rotated synchronously with potentiometer arm 60 by motor 72 and a printed strip 76 associated with the character bearing wheel 74 is periodically driven into engagement with the characters on 74 by a striker bar 78 which is displaced as a result of the movement of armature 80 of solenoid relay 82 when said relay is energized.

During the period when the arm 60 is out of engagement with the other portions of the potentiometer 58, the arm is maintained at the maximum positive measuring circuit potential by the connection of a stabilizing resistor 71, of the order of a megohm or more, between arm 60 and the measuring voltage line 24.

The signals from the balance responsive circuit pass through lead 84 and coupling capacitor 86 to the control grid 88 of amplifier valve 90 through a resistor 92. The junction of capacitor 86 and resistor 92 is connected to ground through the grid leak resistor 94, and the control grid end of resistor 92 is shunted to ground by a filter capacitor 96. The amplifier valve 90 has a cathode 91 connected to a suppressor grid 93 and grounded through cathode resistor 95 to provide operating bias on control grid 88. A space charge grid 98 is situated intermediate control grid 88 and suppressor grid 93, and energized from the battery line 22 through dropping resistor 100 and lead 102. The power supply to space charge grid 98 is filtered for alternating components by the connection of capacitor 104 between the grid 98 and ground.

An anode 106 is located exteriorly of the element assembly so far described in connection with vacuum tube 90 and connected with the battery line 102 through a load resistor 108. Anode circuit filtering discriminating against transient signal components is afforded by the connection of capacitor 110 between the anode 106 and ground. Signals appearing in the anode circuit of valve 90 are transferred to subsequent stages through the coupling capacitor 112 connected between anode 106 and a grid leak 114 having its remote end grounded. A limiting resistor 116 connects the junction of capacitor 112 and grid leak 114 to the control grid 118 of a gaseous discharge trip valve 120. The control grid 118 is shunted to ground by filter capacitor 122 and by a diode 124 so poled that the control grid 118 is restrained from becoming negative with respect to ground. Improved stability is afforded by the connection of a capacitor 126 between control grid 118 and the thermionic cathode 128 of discharge valve 120. A shielding grid 130, situated within discharge tube 120 intermediately of control electrode 118 and anode 132, is directly connected electrically with cathode 128. The anode 132 of the trip valve 120 is connected with the battery line 102 by a resistor 134 and the high voltage anode circuit is completed by the connection of a cathode resistor 136 between cathode 128 and bias tap 16 via line 137. Cathode resistor 136 is shunted by capacitor 138 to improve the commutating properties of the two tube back to back coupled flip-flop circuit as more fully described in the copending application of James R. Cosby, filed August 8, 1946, Serial No. 689,109.

The flip-flop circuit resetting is performed by reset valve 162 having a cathode 164 connected through lead 137 to the bias tap 16 and having a shield grid 166 connected directly to cathode 164. On the side of shield grid 166 remote from cathode 164 there is situated an anode 168 which is connected to battery line 102 through anode resistor 170. Anode 168 of reset valve 162 is coupled to anode 132 of trip valve 120 by commutating capacitor 175 connected therebetween.

A control grid electrode 171 situated between cathode 164 and shield grid 166 serves to control the discharge within the reset valve 162 in response to signals arriving through capacitor 176 connected between control grid 171 and the cathode 172 of the reset diode 174. A direct current return path for control grid 171 is provided by leak resistor 178 connected between control grid 171 and ground.

Again undesired response to stray electric transients is prevented or minimized by a capacitor 180 shunted between control grid 171 and cathode 164.

It may be noted in passing that no appreciable impedance is inserted in the return circuit from cathode 164 and bias tap 16, thus permitting the omission of the precautionary circuit features described in the aforementioned copending application at this point in the circuit. However, the resistor 136 in the cathode return of trip valve 120 gives rise to a positive trigger pulse at the moment of breakdown of trip valve 120. A capacitor 140 connected between cathode 128 of trip valve 120 and the ungrounded end of grid leak resistor 148 impresses the trigger pulse occurring in this portion of the circuit on the control grid 142 of relay control valve 144 through the limiting resistor 146. The relay control valve 144 may, like the tubes in the previously described flip-flop circuit, be of the gaseous-filled type commercially designated "Thyratron." A shield grid 154 within the relay control valve 144 is directly connected with the thermionic cathode 152, and exterior to this electrode assembly there is situated an anode 160 connected with the positive terminal of the anode source 12 by the limiting resistor 161. The winding of a relay 156 connects cathode 152 with bias tap 16 and a reservoir or storage capacitor 158 is shunted between anode 160 and the tap end of the winding of relay 156. A capacitor of 4 mfd. has been found adequate for the storage capacitor 158. The relay 156 carries a pair of normally open contacts connected in series with the solenoid relay 82 and a tapper bar energizing source 163. In practice the tapper bar energizing source 163 and the balance signal source 64 may be the same, but there may exist conditions making it desirable to use commercial line frequencies in the circuit of tapper bar energizing source 162 and some other different frequency for the balance signal source 64 to prevent interference of the power circuits with the balance signal circuits.

The reset diode 174, previously referred to, is arranged in a circuit such that a reset impulse is applied to control grid 171 only during the passage of the arm 60 across the reset tap 70 on potentiometer 58. The cathode 172 of diode 174 is returned to the reset blocking tap 20 through a resistor 182 and the anode 173 of diode 174 is connected with the rotating arm 60 of potentiometer 58. As the positive potential applied to cathode 172 from reset blocking tap 20 is higher than the maximum positive potential existing at any point on the winding of potentiometer 58, there can be no passage of electric current through the reset diode 174 during the measuring portion of the operating cycle. For a portion of its rotation, the arm 60 "floats" which is to say that it is disengaged electrically from all portions of potentiometer 58. During this period, the anode 173 has its potential fixed by the leak resistor 71 connected between arm 60 and measuring circuit tap 18. The arm 60 and its associated circuits is thereby held at a potential low enough to prevent conduction through the reset diode 174 and, at the same time, high enough to also prevent conduction through the balance sensing diode 46.

With the foregoing mutually cooperative relationship of the parts in mind, the operation of the apparatus may now be readily understood. The motor 72 drives the potentiometer arm 60 and printer wheel 74 continuously. The lead 40 impresses on anode 44 a direct current potential indicative of conditions existing at the measuring station 27. This potential will always lie between 0 and 50 volts. As the arm 60 of potentiometer 58 is rotated, it impresses on cathode 52 of the balance signal diode 46 a search potential varying periodically from 0 to 50 volts in smooth continuous fashion, the search voltage starting at 50 volts positive with respect to ground and decreasing gradually to 0. At some point during this variation, the voltage at cathode 52 becomes very nearly equal to that existing at anode 54, whereupon the alternating potentials superimposed on cathode 52 periodically drive cathode 52 negative with respect to anode 44 producing a pulsating current in the lead attached to anode 44. These pulses develop a corresponding pulsating voltage across the bridge signal resistor 48 which passes through the signal amplifier valve 90 where its voltage excursions are amplified and then impressed on the trip valve 120. A discharge is now initiated in the valve 120 producing a positive pulse in its cathode circuit which then initiates a discharge in relay control valve 144. Breakdown of the relay control valve 144 discharges reservoir capacitor 158 through relay 156, momentarily closing the contacts of relay 156 and instantaneously energizing the solenoid 82 from source 162 to drive the tapper bar 78 against the printing strip 76, carrying it into engagement with the printer wheel 74 to print on the strip 76 a figure indicative of the angular position of arm 60 of the potentiometer 58 at the time when the search voltage developed from potentiometer 58 was equal to the measuring station output. As a given measuring station output voltage corresponds to a predetermined value of the condition under measurement, the printer wheel may be directly calibrated to indicate the condition value at this time.

Continuing rotation of potentiometer arm 60 decreases the direct current voltage component at 52 still further, thus increasing the signal input to control grid 118 of trip valve 120. The control grid 118 is alternately driven positive and negative. The anode current passing through the trip valve 120 is limited by resistors 134 and 136 and, hence, there is danger that the application of negative signals to control grid 118 may interrupt the discharge flowing through the trip valve 120, which might give rise to successive erroneous printing operations. The possibility of such an occurrence is eliminated by the connection of clamping diode 124 between control grid 118 and ground with the diode anode connected to ground. Upon the arrival of a signal of negative polarity at grid 118, conduction in the diode 124 is established to limit the negative signal excursion and prevent the interruption of the arc discharge within trip valve 120.

Continuing rotation of the potentiometer arm 60 disengages the arm 60 from the active elements of the potentiometer. At this time, current flowing through stabilizing resistor 71 brings the potential of arm 60 and its associated circuits to the maximum measuring circuit potential, approximately 50 volts, with respect to ground. This potential insures that alternating current signal transmission through the balance signal diode 46 is prevented and, at the same time, maintains anode 173 of the reset diode 174 negative with respect to its cathode 172, preventing operation of the reset circuit. With the further movement of the potentiometer arm 60, the reset contact 70 is traversed, momentarily raising the arm circuit potential to the full anode supply voltage of 150 volts, swinging anode 173 positive with respect to cathode 172 to develop across reset diode load resistor 182 a 50-volt pulse triggering the reset valve 162 through coupling capacitor 176 to establish a discharge in the reset valve 162 and extinguish that in trip valve 120. This arm voltage of 150 volts carries the cathode 52 of balance signal diode 46 still further positive with respect to its associated anode, preventing operation of the signal circuit at this time. This prepares the circuit for a repetition of the measuring operation which is initiated with the re-engagement of the winding of potentiometer 58 by the potentiometer arm 60 in its subsequent rotation.

Values of circuit components which have been found suitable for making observations at the rate of 2 per minute follow:

| | | |
|---|---|---|
| Balance signal resistor 48 | ohms | 220,000 |
| Line filter capacitor 50 | mfd | 1 |
| Stabilizing resistor 71 | megohms | 10 |
| Coupling capacitor 86 | mfd | .05 |
| Limiting resistor 92 | ohms | 100,000 |
| Grid leak resistor 94 | do | 220,000 |
| Grid filter capacitor 96 | mfd | .01 |

| | | |
|---|---|---|
| Grid dropping resistor 106 | megohms | 1.5 |
| Anode load resistor 108 | ohms | 220,000 |
| Anode filter capacitor 110 | mfd | .01 |
| Trip input capacitor 112 | mfd | .05 |
| Trip input grid leak 114 | ohms | 220,000 |
| Trip input limiting resistor 116 | do | 220,000 |
| Trip input filter capacitor 126 | mmfd | 250 |
| Trip anode resistor 134 | ohms | 220,000 |
| Trip cathode resistor 136 | do | 10,000 |
| Trip cathode capacitor 138 | mfd | .005 |
| Trip output coupling capacitor 140 | mfd | .05 |
| Relay control limiting resistor 146 | ohms | 220,000 |
| Relay control grid leak 148 | do | 220,000 |
| Relay control input filter capacitor 150 | mmfd | 250 |
| Storage capacitor 158 | mfd | 4 |
| Limiting resistor 161 | ohms | 470,000 |
| Reset anode resistor 170 | do | 220,000 |
| Commutating capacitor 175 | mfd | .01 |
| Reset input coupling capacitor 176 | mfd | .05 |
| Reset input filter capacitor 180 | mmfd | 250 |
| Reset diode load 182 | ohms | 220,000 |

While the trip apparatus illustrated as controlling the operation of the tapper bar incorporates a pair of vacuum tubes, it is to be understood that the use of any type of trip apparatus characterized by at least two conditions of equilibrium separated by a region of instability is contemplated, in which one or the other of the two stable conditions may be established by the application of trip and reset pulses to the proper input terminals. It is further obvious that the device or devices responsive to the output of this measuring circuit may respond as visual indicators or may indicate their response by effecting a control operation. The term indicating device as used herein is intended to embrace both types of operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalents of the claims are therefore intended to be embraced thereby.

What is claimed and desired to be secured by United States Letters Patent is:

1. In electric measuring apparatus, means adapted to receive a potential under test, means for developing a search potential varying through a measuring range, means for superposing on said search potential a periodic electric energy wave, circuit means adapted to receive said search potential with its superposed wave and said potential under test, said circuit means becoming conductive when said search potential and said potential under test bear a predetermined relation to one another, whereby current flow is established as a series of pulses at the frequency of said periodic wave, and indicating means responsive to the flow of said current pulses.

2. In electric measuring apparatus, means adapted to receive a potential under test, means for cyclically producing a search potential varying through a predetermined range, said search potential cycles being spaced in time, means for superposing on said search potential a periodic electric energy wave, trip apparatus having trip and restoring input terminals, means for applying a first energizing impulse at the frequency of said periodic wave to said trip terminals when said potential under test and said search potential bear a predetermined mutual relationship, and means for applying a second energizing impulse to said restoring terminals during the interval between search potential cycles.

3. In an electric measuring apparatus, means adapted to receive a potential under test, means for developing a search potential sweeping through a measuring range in a predetermined sense, unilaterally conducting means connected between said search potential and said potential under test with such polarity that said unilaterally conducting means is substantially non-conductive at the initiation of the measuring sweep, means for superposing a periodic electric voltage on said search potential, said unilaterally conducting means becoming conductive when said potential under test and said search potential bear a predetermined relation to one another, whereby a current flows in pulses at the frequency of said periodic wave, an amplifier responsive to the flow of said current pulses, and indicating means responsive to the output of said amplifier.

4. In electric measuring apparatus, means adapted to receive a potential under test, means for developing a search potential sweeping through a measuring range in a predetermined sense, unilaterally conducting means connected between said search potential and said potential under test with such polarity that said unilaterally conducting means is substantially non-conductive at the initiation of the measuring sweep, means for superposing a periodic electric voltage on said search potential, said unilaterally conducting means becoming conductive when said potential under test and said search potential bear a predetermined relation to one another, whereby a current flows in pulses at the frequency of said periodic wave, a coupling circuit responsive to the flow of said current pulses, means suppressing pulses other than those of a predetermined polarity, and indicating means responsive to the output of said coupling circuit.

5. In electric measuring apparatus, a first source of electric voltage, a second source of electric voltage, a search source of periodically varying electric voltage, means connecting said search source with said first source when said search voltage is less than said first source voltage, means connecting said search source with said second source when said search voltage is greater than said second source voltage, and indicating means responsive to the currents flowing in the connections so established.

6. In electric measuring apparatus, a first source of electric voltage lying within a predetermined range, a second source of electric voltage lying without said predetermined range, a search source of periodically varying electric voltage, means connecting said search source with said first source when said search voltage is less than said first source voltage, means connecting said search source with said second source when said search voltage is greater than said second source voltage, and indicating means responsive to the currents flowing in the connections so established.

7. In electric measuring apparatus, a first unilaterally conducting device and a second unilaterally conducting device connected in series, means for periodically varying the potential of the junction between said unilaterally conducting devices, means adapted to impress a potential under test on the free terminal of said first unilaterally conducting device, means adapted to impress a predetermined potential on the free terminal of said second unilaterally conducting device, and indicating means jointly and differently responsive to current flow through said first and second unilateral conducting devices.

8. In electric measuring apparatus, a first unilaterally conducting device and a second unilaterally conducting device connected in series, means for periodically varying the potential of the junction between said unilaterally conducting devices, means adapted to impress a potential under test on the free terminal of said first unilaterally conducting device, said potential under test being confined to a predetermined range of variation, means adapted to impress a predetermined potential falling outside said predetermined range of variation on the free terminal of said second unilaterally conducting device, tripping apparatus having trip and reset terminals, means impressing on said trip terminal a voltage derived from the current flowing through one of said unilaterally conducting devices, and means impressing on said reset terminal a voltage derived from the current flowing through the other of said unilaterally conducting devices.

9. In electric measuring apparatus, a first unilaterally conductive device and a second unilaterally conductive device connected in series with like conducting senses, a member relatively movable over and in engagement with an impedance element and a contact spaced therefrom, said impedance element and said contact being associated with circuits impressing electric voltages thereacross and thereon, respectively, means connecting said relatively movable member with the junction between said unilaterally conductive devices, means adapted to impress a potential under test on the free terminal of said first unilaterally conductive device, said potential under test being confined to a predetermined range of variation, means adapted to impress a predetermined potential falling outside said predetermined range of variation on the free terminal of said second unilaterally conductive device, tripping apparatus having trip and reset terminals, means impressing on said trip terminal a voltage derived from the current flowing through one of said unilaterally conductive devices, and means impressing on said reset terminal a voltage derived from the current flowing through the other of said unilaterally conductive devices.

10. In electric measuring apparatus, a first unilaterally conductive device and a second unilaterally conductive device connected in series, a member relatively movable over and in engagement with an impedance element and a contact spaced therefrom, said impedance element and said contact being associated with circuits impressing electric voltages thereacross and thereon respectively, means connecting said relatively movable member with the junction between said unilaterally conductive devices, means for stabilizing the potential of said junction when said relatively movable member is disengaged from said impedance element and said contact, means adapted to impress a potential under test on the free terminal of said first unilaterally conductive device, means adapted to impress a potential on the free terminal of said second unilaterally conductive device, and indicating means jointly and differently responsive to current flow through said first and second unilateral conductive devices.

11. In electric measuring apparatus, a first unilaterally conductive device, a second unilaterally conductive device, a source of periodic electric potential connecting unlike terminals of said unilaterally conductive devices, means for impressing a variable search potential on said unlike terminals, means adapted to impress a potential under test on the free terminal of said first unilaterally conductive device, means adapted to impress a predetermined potential on the free terminal of said second unilaterally conductive device, and an indicating device responsive to the flow of current through said first unilaterally conductive device and said second unilaterally conductive device.

12. In electric measuring apparatus, a first unilaterally conductive device, a second unilaterally conductive device, a source of periodic electric potential connecting unlike terminals of said unilaterally conductive devices, means for impressing a variable search potential on the terminal of said second unilateral conductive device so connected, means adapted to impress a potential under test on the free terminal of said first unilaterally conductive device, means adapted to impress a predetermined potential on the free terminal of said second unilaterally conductive device, tripping apparatus having trip and reset terminals, means impressing on said trip terminal a voltage derived from current pulses at said periodic rate flowing through said first unilaterally conductive device, and means impressing on said reset terminal a voltage derived from the current flowing through said second unilaterally conductive device.

13. In electric measuring apparatus, a trip circuit having trip and restoring input terminals and adapted to be tripped upon the receipt of impulses of a predetermined polarity, means adapted to receive a potential under test, the test potential having a maximum value, a linear bilateral impedance connected in series with a unilaterally conducting device and to said test potential receiving means, said unilaterally conducting device being characterized by the presence of shunt capacity, means connected with said series combination for developing a search potential sweeping through a range in a predetermined sense, the maximum search potential developed being substantially greater than the maximum value of said test potential, said search potential developing means causing a transient voltage to appear across said impedance in response to the maximum search potential, the said transient voltage having the polarity required to trip said trip circuit, and a polarity reversing circuit operatively connecting said trip input terminal with said impedance, whereby the said trip circuit will not be tripped in response to said transient voltage.

RALPH E. STURM.
JAMES R. COSBY.

REFERENCES CITED

The following references are of record in the file of this patent:

UNITED STATES PATENTS

| Number | Name | Date |
| --- | --- | --- |
| Re. 22,794 | Deakin | Oct. 1, 1946 |
| 2,279,232 | Graham | Apr. 7, 1942 |
| 2,321,605 | Keinath | June 15, 1943 |
| 2,405,843 | Moe | Aug. 13, 1946 |
| 2,421,606 | Fitch | June 3, 1947 |
| 2,427,355 | Keinath | Sept. 16, 1947 |